United States Patent
Sullivan

[11] Patent Number: 6,142,104
[45] Date of Patent: Nov. 7, 2000

[54] LARIAT ROPE BODY

[75] Inventor: Paul Ormon Sullivan, Tolar, Tex.

[73] Assignee: Equibrand Corporation, Granbury, Tex.

[21] Appl. No.: 09/258,919

[22] Filed: Mar. 1, 1999

Related U.S. Application Data

[63] Continuation-in-part of application No. 09/062,569, Apr. 20, 1998, Pat. No. 5,941,198.

[51] Int. Cl.$^7$ .................................................. A01K 15/00
[52] U.S. Cl. .............................................. 119/805; 57/232
[58] Field of Search .............................. 119/805; 57/210, 57/232

[56] References Cited

U.S. PATENT DOCUMENTS

| | | | |
|---|---|---|---|
| 1,558,420 | 10/1925 | Whitlock | 57/211 |
| 2,040,518 | 5/1936 | Lewis et al. | 57/210 |
| 3,026,669 | 3/1962 | Stanton | 57/211 |
| 3,043,086 | 7/1962 | Hood | 57/211 |
| 3,395,530 | 8/1968 | Campbell | 427/389 |
| 3,415,052 | 12/1968 | Stanton | 57/231 |
| 3,581,486 | 6/1971 | Dibble | 57/22 |
| 3,828,544 | 8/1974 | Alker | 57/210 |
| 4,022,010 | 5/1977 | Gladenbeck et al. | 57/231 |
| 4,202,164 | 5/1980 | Simpson et al. | 57/232 |
| 4,343,343 | 8/1982 | Reuter | 152/556 |
| 4,499,144 | 2/1985 | Van Rijswijk | 428/376 |
| 4,537,019 | 8/1985 | Matsui et al. | 57/202 |
| 4,562,793 | 1/1986 | Simpson | 119/805 |
| 4,563,869 | 1/1986 | Stanton | 57/211 |
| 4,624,097 | 11/1986 | Wilcox | 57/232 |
| 4,648,352 | 3/1987 | Smith | 119/805 |
| 4,887,422 | 12/1989 | Klees et al. | 57/220 |
| 4,947,727 | 8/1990 | Momoi | 87/12 |
| 5,852,926 | 12/1998 | Breedlove | 57/210 |

*Primary Examiner*—Michael J. Carone
*Assistant Examiner*—James S. Bergin
*Attorney, Agent, or Firm*—John H. Miller

[57] ABSTRACT

A cattle roping lariat rope body for making competitive cattle roping lariats, the rope body having a core of monofilaments in the center around which three or more strands of twisted monofilament yarns are wound tightly to form the rope body. The rope body also contains a wax.

16 Claims, 6 Drawing Sheets

LARIAT ROPE BODY

This application is a continuation-in-part application of United States patent application Ser. No. 09/062,569, filed Apr. 20, 1998, now U.S. Pat. No. 5,941,198.

BACKGROUND

This invention involves the construction of a special kind of lariat rope for making lariats for use in competitive cattle roping contests that provide substantial prize money for the fastest times. Lariats of different construction are used for heel and head roping in team roping, and a still different construction is preferred for calf roping. Lariats are also used by ranch hands in everyday roping of cattle and horses as part of ranching practice and animal husbandry. The invention also involves the method of making lariat rope and lariats and novel equipment for making rope, particularly the lariat rope of this invention.

Lariats have been used in ranching and rodeos for over 100 years. The term lariat defines a rope having some form of honda or knot at one end which, when the other end of the rope is pulled through the honda, a loop is formed that is used to encircle and then tighten around the object the lariat is being used to catch. The term lasso is often used interchangeably with the term lariat.

In recent times the prize money for top times in team roping and calf roping have escalated rapidly, and competitions now exist for all levels of roping skills from world class ropers down through beginners. Currently, the prize money in the team roping finals competition may be as much as $180,000 per roper. The purse is usually broken down step wise for six places with the top time getting 29 percent and the sixth best time getting 5 percent. Competitive ropers are handicapped similar to golfers, and a competitive roper competes with those having similar handicaps.

Team Roping is the only rodeo event where two cowboys compete as partners, each sharing victory or defeat on the back of a horse. The "header" ropes a steer's horns and rides to the left. Then the "heeler" goes to work, roping both of the steer's hind legs in one of the most difficult maneuvers in rodeo. The ropers must each "dally" (wrap their rope around their saddle horn) after their head or heel catches. The time clock stops when both horses are facing the steer with ropes dallied. A five second penalty is assessed if the heeler catches only one of the steer's hind legs. In ranching practice, large cattle would be roped and taken down in this manner and one or more ranch hands or a veterinarian would rush to the immobile animal to mark, vaccinate or treat the animal for some malady.

Calf roping, which can be traced directly to the ranch work of catching calves for branding or medical treatment, has evolved into one of professional rodeo's quickest and most exciting events. The calf gets a designated head start into the rodeo arena and must trip a barrier string before the cowboy and horse can begin the chase. Once in the arena, the roper must "catch" his calf with his lariat, dismount, run to the calf, , drop the 300 pound animal to the arena floor, gather three of the calf's legs and tie them together with a six-foot "pigging" string and throw up his hands to signal the end of his run.

The Professional Rodeo Cowboy Association national final's record for Team Roping is 3.8 seconds, set at a National Finals Rodeo. There are many competitive Team Roping events all around the country, and a member of a roping team having a typical time of around 5 seconds can earn more than $20,000 per year roping only on Friday nights and weekends. With the record time for Team Roping being 3.8 seconds, the winning times usually are determined by hundredths or tenths of a second. This, combined with the prize money involved, makes the performance of the equipment used in the roping process very critical. The most important piece of equipment is the lariat.

First, the rope for a lariat must be stiffer or harder than conventional general duty ropes. This characteristic is referred to as body. This has been achieved with more twists and by twisting and final winding of the rope under high tension in the manufacturing process and finally by impregnating team roping lariats with a wax. Second, the rope or lariat must feel good in the roper's hand. This is subjective, but is a combination of weight, flexibility or stiffness, and smoothness. While feel hasn't yet been defined with a combination of objective test properties, the feel affects the roper's effectiveness and thus his selection of a lariat. Each competitive roper will typically buy 35–50 ropes per year. Next, the rope must have enough weight per inch, density, to feel and throw well, i. e. for the roper to sense where the tip of the lasso, leading portion of the loop, is and for the tip to fly in the direction of the throw.

Finally, the surface of the lariat rope must be smooth and slick enough for the rope to slide quickly on the burner of the honda as the loop is reduced to tighten around subject of the throw, i. e. the horns, legs, etc. The honda, sometimes spelled hondoo or hondo, is a small loop in one end of the rope through which most of the remainder of the rope passes to form the lasso or lariat loop. The burner is an appliance fastened to the lead portion of the honda on at least the inside portion of the rope for the rope to slide against when the loop is being reduced to tighten on the object being roped. The burner protects the rope from abrading and also reduces the resistance of the sliding rope, i. e. makes the rope faster. One common burner consists of rawhide sewn onto the honda. A honda and burner are shown in U.S. Pat. No. 2,643,638 and other hondas are shown in U.S. Pat. Nos. 3,165,091, 3,716, 031, 4,562,793 and 4,928,634.

Generally, it is desired to have a denser rope with the same or a smaller diameter than conventional lariat rope. Attempts have been made to achieve this by twisting tighter, i. e. more twists per inch and/or by twisting under higher tension. Lariat rope made in this way are "bouncy" and the loops of these lariats tend to bounce off the surface they strike instead of staying in contact. This often makes the roper miss. The loop should actually collapse, generally into a FIG. 8, immediately after contacting the neck, etc. of the steer until the loop can be reduced to tighten onto the horns. A "bouncy" rope is too stiff to allow this to happen easily as is necessary for increasing the percentage of successful catches.

To get the desired density in the lariat rope, it has been conventional to blend polyester monofilament yarns with plied and/or cabled nylon in the strands. This technique has been used to make state of the art lariat rope, all of which were coreless, prior to the present invention, but it has made the ropes harder to manufacture. The stiffness and humidity absorption characteristics of the polyester fibers are different than those of nylon, and a careful blend has been necessary to balance density with feel and body characteristics, particularly when the lariat rope is made or used in high humidity conditions.

The conventional lariat rope has been made mostly with conventional rope-making equipment. Lariat ropes have been made by twisting three bundles of monofilament yarns, plied yarns and cabled yarns of desired length individually under tension followed by twisting the three twisted bundles together under tension to make the rope. The head box of conventional lariat rope making machines has three hooks spaced apart in-line to hold the three bundles of yarns under tension, the other ends held by a tailbox, while they are twisted into rope. Rope for making a lariat is made one short section, typically 25–40 feet long (shorter for children), at a time. This is quite different from the way rope for other applications is made. The rope section is the length needed to make a lariat. A rope section for making lariats is typically called a rope body.

After the rope section is made, the two ends are taped or tied to prevent unraveling, the ropes are soaked in hot wax to heat the ropes to about 300 degrees F. and then cooled under tension to remove any curling memory from the fibers. The honda is then tied into the rope and the burner appliance is attached as shown in the patent mentioned in the preceding paragraph.

Conventional lariat rope is a three strand rope made from nylon or a blend of nylon and polyester yarns, such as shown in U.S. Pat. No. 4,648,352. One very successful conventional lariat rope is made by first plying two yarns of 1260 denier containing 204 monofilaments each together with 2–6 twists per inch in the Z direction. Next, three of these plied strands are cabled together, again with 2–6 twists per inch, and wound onto cardboard bobbins. Conventional twisting, plying and cabling equipment are used to make the plied and cabled strands.

In the past, calf lariat rope has been made with either polypropylene treated with linseed oil to stiffen the rope or hemp treated with linseed oil and shellac. Surface burrs have to be removed on the hemp rope, and this type of hemp rope is sensitive to changes in humidity giving the lariat rope a different stiffness and feel that differs depending upon the level of humidity in the air. The polypropylene lariat rope doesn't have as much density, weight per unit volume or per linear foot, as desired for optimum accuracy and other performance including how the slack is pulled from the loop. Also, polypropylene rope stretches more under stress than desired.

In a totally different field, it is known to make heavy duty marine ropes and ropes for use on automatic winching machines having a core as disclosed in U.S. Pat. Nos. 4,563,869, 3,415,052 and 3,026,669. However, such ropes had very heavy structures, were for vastly different purposes and not suitable for lariats.

SUMMARY OF THE INVENTION

The invention includes a lariat rope body and a lariat comprised of three or more twisted strands forming a shell, each strand containing a plurality of yarns comprising a plurality of continuous monofilaments in yarn form and a core comprising a plurality of monofilament yarns, said strands having been wound or twisted around the core under tension to produce a hard, stiff rope. The rope is soaked in a hot wax to form a rope body. The yarns can be in untwisted, twisted, plied or cabled form or mixtures thereof. The lariat also comprises a conventional honda which can be any of the types well known in art of making lariats.

Preferably, the lasso rope body comprises four strands in a shell around a core. Preferably, the core is made up of a plurality of monofilaments or monofilament yarns, some or all of which can have a higher density than the majority of the monofilaments in the shell, but preferably, the core of heel and head rope bodies for team roping are comprised mostly or entirely of nylon monofilament yarn, twisted, plied and/or cabled yarns and combinations thereof. The strands forming the shell around the core are comprised mostly or entirely of nylon monofilament yarns, some or all of which can be twisted, plied and/or cabled, most preferably cabled. In the most preferred embodiment for team roping bodies, the core is made entirely of cabled nylon yarns. In the most preferred embodiment for calf roping, the core is made entirely of cabled polyester yarns.

Some or all of the yarns, preferably in the core, can be air spliced short ends. Short ends are lengths of yarn that are not long enough to make one lariat rope body, usually a remnant on a bobbin or package of yarn. In the past these short ends have been discarded as waste or sold at scrap prices. It has now been discovered that these short ends can be spliced and used, particularly in the core, of the present inventive lariat rope bodies and lariats without causing any manufacturing problems and without affecting the performance of the lariat in competition. Typically, only about one or two splices end up in the core, but it is possible to have more in the core because splices in the core do not show on the outside and their use does not indicate any noticeable difference in performance.

The total denier of the monofilament yarns going into the core is at least about 30,000 but at least 35,000 is better and the most preferred is above 40,000 such as about 45,360 up to at least 58,500, e. g. about 48,000 for a calf rope body. Preferably, the total denier of the monofilament nylon yarns going into the core ranges from about 45,000+/– up to 10 percent to about 53,000+/– up to 10 percent for head and heel team roping rope bodies and lariats. The most preferred is about 45,360 for head ropes and about 52,920 for heel ropes. The total denier of the polyester or DACRON™ monofilament yarns going into the core of calf ropes is preferably about 48,000+/– up to 10 percent with about 48,000 being most preferred. Most preferably the total denier of the monofilament yarns going into the core can vary from +/–500 up to about +/–3 percent. The core preferably contains cabled yarns, but can be made up entirely of untwisted monofilaments or any combination of untwisted monofilament yarn and/or twisted, plied, and cabled yarns or other fabricated configurations and mixtures thereof.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either not surprising or, because of either a break in the continuity of results or one or more features that are significantly better than reported here, is surprising and thus an unobvious teaching leading to a useful result.

The total denier of the monofilament material going into each strand in a four strand rope is preferably at least about 75,000 with at least 84,000 or 88,000 being better and about 90,720 being most preferred. Higher total deniers of monofilaments per strand of at least 95,000 or higher are suitable for some roping uses. The total denier of the monofilament yarn material going into each strand is preferably about 90,720+/– up to 10 percent for the head and heel ropes for team roping, with about 90,720 being most preferred. The total denier of the monofilament yarn material going into each strand is preferably about 84,000+/– up to 15 percent for ropes for calf roping with about 84,000 being most preferred. Most preferably, the total denier of the material going into the strand on all rope bodies will vary from less than about +/–500 denier to +/–3 percent. Since the denier of the monofilament yarn is partly dependent upon the density of the material used to make the monofilaments, the deniers provided here relate the material used in the preferred embodiments respectively.

Preferably, the rope bodies for lariats contain either all nylon or all polyester monofilament yarns, but bodies containing mixtures of these filaments or yarns, with or without filaments or yarns of other materials, are also suitable. Also, other types of monofilament material having similar characteristics to nylon or polyester would be suitable to use in place of some or all of the nylon, polyester or DACRON™ monofilaments in the lariat rope structures of this invention, such as polypropylene, polyethylene and the like. The core preferably contains cabled yarns, but can be made up entirely of untwisted monofilaments or any combination of untwisted monofilament yarn and/or twisted, plied, and cabled yarns or other fabricated configurations and mixtures thereof.

The invention also includes a rope lariat comprising a rope body as described above which has been soaked in hot wax and a honda of any known type, but preferably like that shown in the patent mentioned above. Preferably, the honda also comprises a burner which can be any known material or treatment, but preferably is made of rawhide such as that shown in U.S. Pat. No. 2,643,638.

The invention also includes a method of making novel lariat rope bodies and novel lariats of the type described above comprising forming three or more bundles of yarns spaced apart, each yarn comprising a plurality of monofilaments, at least one of the yarns being a plied yarn or cabled yarn, twisting each of said three or more bundles under tension to form three or more strands, locating a core within an area bordered by a portion of each of the outer diameters of said bundles, and twisting or winding said strands around the core under tension to form the rope. The core is comprised of a plurality of monofilaments or monofilament yarns. One or more of the yarns can be a twisted, plied or cabled yarn. In the method, a cross having a hole in its center through which the core material passes is used to facilitate forming of the rope.

To make a lariat, the rope body described above is soaked in hot wax to heat the rope to relax any memory in the fibers and to saturate the rope with wax, excess wax is removed and the lariat rope is cooled while held essentially straight under tension. A honda is then affixed to the rope, preferably by tying a small loop in the end of the rope, and preferably a burner is attached to the honda such as by sewing a wet rawhide to the honda in a known manner.

The invention also includes apparatus for making a rope body comprising a novel head box with at least three hooks or bundle holders spaced equidistant from a center point for holding one end of each bundle, a novel cross box sled for holding a novel cross with a hole in its center portion, for holding one end of a core and for applying both tension and compression forces during the rope making process and a novel tail box having a single hook or bundle holder for holding the other end of each of said bundles and a tension mechanism for applying tension to said bundles and a drive for rotating said hook or bundle holder to twist said bundles into a rope body, at least two of said head box, cross box and tail box being movable and at least the head box or the tail box being fixed. Preferably, the cross box and the tail box are movable and the head box is fixed and preferably the cross box also holds a bobbin of core strand.

The invention also includes a novel cross box described herein with a novel cross having a hole in the center to allow core material to be pulled therethrough in combination with a conventional head box and/or a conventional tail box. The present invention also includes a novel head box described herein having a plurality of hooks, each of which is equidistant from a center point, in combination with a cross box and/or tail box of another's design. The invention also includes the novel tail box disclosed herein having a single hook in combination with a head box and/or cross box of another's design. The invention also includes the novel cross having a hole in or near the center of the cross for placing the core strand in the rope body.

BRIEF DESCRIPTION OF THE SEVERAL DRAWINGS

FIG. 7A is a schematic showing how the rope-making machine is laced in with a bundle of yarns at the start of a rope-making process.

DETAILED DESCRIPTION OF THE INVENTION

Figure 1:
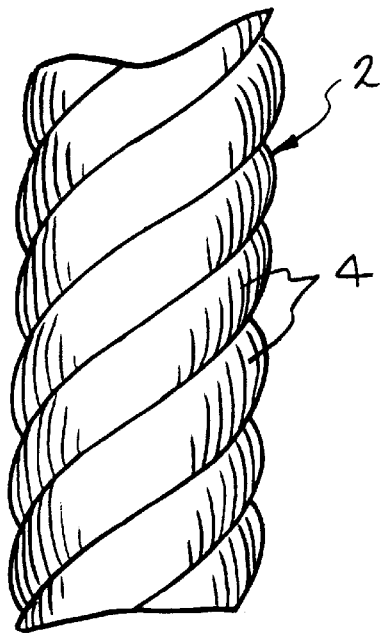
FIG. 1 is a plan view of a portion of a prior art lasso rope.
Figure 2:
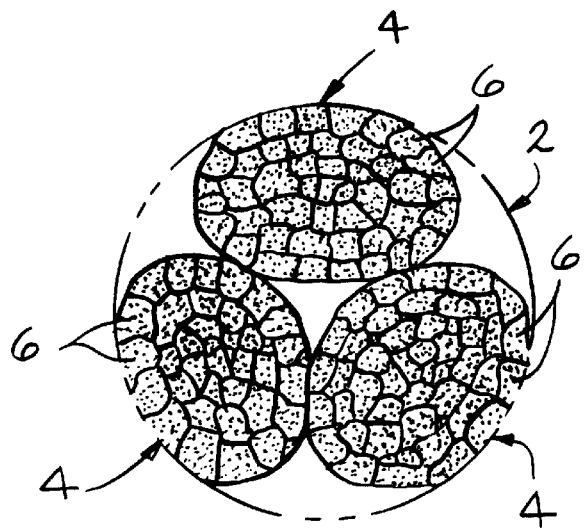
FIG. 2 is an end view of a conventional lasso rope.

FIG. 1 shows a plan view of a portion of a conventional lariat rope 2 having three strands 4 twisted together and FIG. 2 is an end view of this rope. Usually, the three strands 4 are all alike. Typically, each strand in conventional ropes are made from combinations of a plurality of monofilament yarns 6 of nylon and sometimes polyester with some of the yarns 6 sometimes being plied yarns and/or cabled yarns. The actual combination of the yarns and materials is a matter of choice and varies with the manufacturer and the product line. This general type of rope, with the various modifications, is widely used in roping competition and in animal husbandry.

The invention includes a new rope body structure having a core and three or more strands. The inventive lariat rope body produces superior results with ropers having all levels of roping skills in all kinds of roping events. These results include percentage of catches, shorter times and longer lariat life.

Figure 3:
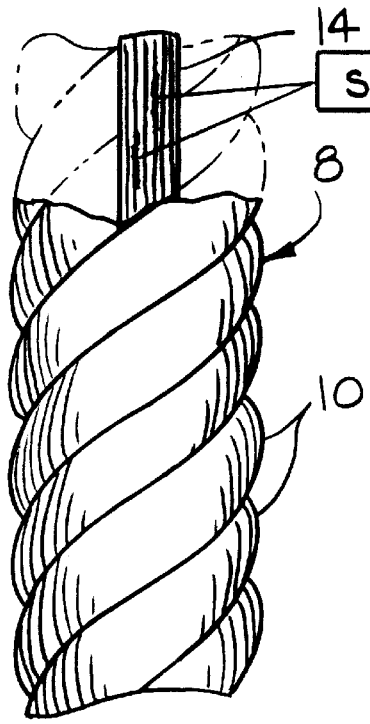
FIG. 3 is a plan view of a portion of a preferred four strand and cored lasso rope of the present invention.
Figure 4:
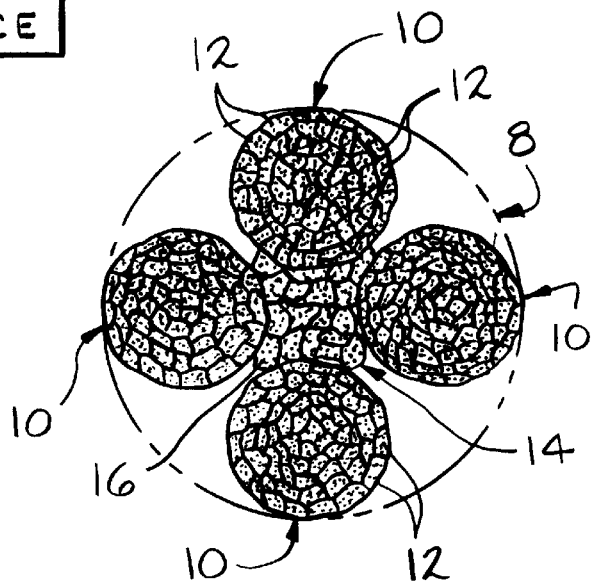
FIG. 4 is an end view of the preferred lasso rope of the present invention.

A preferred embodiment of this inventive rope body structure is partially shown in plan view in FIG. 3. This preferred rope 8 has four strands 10 twisted together around a core 14. As shown in FIG. 4, which is an end view of the rope portion shown in FIG. 3, each strand 10 is made up of a plurality of yarns 12 which can be monofilament yarns, plied yarns and/or cabled yarns and mixtures thereof.

In one embodiment of a lariat rope body, the yarns 12 are all alike and are twelve in number being cabled nylon referred to as 1260 - 2(3.4 Z) - 3 (3.07 S), but the strands 10 can be made up from any of many combinations of monofilament yarns, plied yarns and/or cabled yarns of nylon, polyester, polyethylene, Dacron™, cotton and other fibers of other materials and mixtures thereof. The designation 1260 - 2(3.4 Z) - 3 (3.07 S) means a cabled yarn made by twisting three plied yarns together by twisting in the S direction in an amount of about 3.07 turns or twists per inch (tpi) of cabled yarn in a known manner, each plied yarn having been made by twisting two 1260 denier monofilament yarns together in the Z direction in an amount of about 3.4 tpi of plied yarn, in a known manner. The twists of the plied yarn and the cabled yarn can vary, such as from about 2 tpi to about 6 tpi, preferably by about 30 percent above and below the preferred amounts shown above. In the summer when it is hot in the plant, the twist is reduced, for example to about 2.5 tpi. In this rope structure, the denier of each cabled yarn is about 7560. The plied yarns can contain more than two twisted or untwisted monofilament yarns, and the cabled yarn can contain different numbers of plied yarns or a combination of plied yarn and monofilament yarn twisted or cabled together.

The starting 1260 monofilament yarn is preferably a nylon monofilament yarn having 204 filaments with about 0.3 tpi Z twist, such as nylon 1260-204-0.3Z - 1R70 from Allied Signal Fibers, but can be other yarns from other suppliers, being of different material, having different numbers of filaments therein, different deniers, different amounts and/or direction of twist, and different finishes or treatments (the 1R70 designation refers to the manufacturers product identification of the yarn). For example, the denier can vary at least within the range of about 500–1680, the filament count can vary considerably, which sometimes will necessitate a change in the diameter of the individual filaments.

While the preferred lasso rope bodies described herein have four strands around a core, the number of strands can be as few as three and more than four such as up to 6 or 8 strands. The structure for the preferred rope bodies for different roping applications differ somewhat. For making lariat rope bodies for team head roping it is preferred to use nylon 6, 1260 denier monofilament yarn designated 204 - 0.3 Z - 1R70 available from Allied Signal Fibers of Allied Signal, Inc. of Morristown, N.J. To prepare this yarn for making each of the four strands on the rope body machine, two of these yarns are first plied together with a 3.6Z twist and then three of these plied yarns are twisted or cabled together with a 2.7S twist to make cabled yarn. The total denier of the yarn going into this cabled yarn is about 7,560. The core of the preferred head rope body preferably uses six of these same cabled yarns, thus the total denier of the yarns going into the core is about 45,360.

The total denier for the yarn going into each of the four strands of this preferred head rope body is about 90,720 and, with the total denier of the yarn in the core being 45,360, the total denier of the yarn going into this rope body is about 408,240. This can vary some as described above due to variation in the starting material and to make other embodiments.

The preferred structure for a team heel lariat rope differs from the preferred head rope structure. It is preferred to use DuPont's nylon 66 1400 - 1260 denier, 210 filament, R20 - 728 yarn, available from DuPont, Co. of Wilmington, Del., for the strand in the shell. For the core, it is preferred to use Allied Signal's nylon 6 yarn, such as 1000 - 0192 - 1W74. Cabled yarn is preferred for the strands and the core and the cabled yarns are prepared in the same manner as in the head rope, except that 7 cabled yarns are preferably used in the core of the heel rope body structure.

The total denier of the yarns in each of the four strands in this preferred heel rope body structure is the same as that of the yarn in the strands in the head rope, but the total denier of the yarn going into the core in the preferred heel rope is about 52,920 and the total denier of the yarn going into this heel rope body structure is about 415,800. This total denier going into the heel rope body can vary from about 302,000 to about 424,000 or more as described above. The total denier of the yarn going into the core can vary as described in the summary of the invention. Also, other fibers can be used in the heel rope body, such as nylon 6, but the nylon 66 fibers seem to make a harder rope structure which is preferred.

The rope body structure preferred for making a calf roping lariat begins with the use of DuPont's DACRON™ polyester yarn DTE 1000 (denier) - 140 (filaments) - R02 - 51B, plied and cabled, in each of four strands in the rope body structure. Three of these yarns are plied together, preferably with about a 3.38 Z twist. Two of these plied yarns are then cabled or twisted together, preferably with about a 2.5 S twist to create cabled yarn having a denier of about 6,000. Each strand of the preferred calf rope body structure contains 14 of these cabled yarns so the total denier of the yarn going into each strand is about 84,000.

The core of the preferred calf rope body structure contains 16 SPIRAL FLEX™ polyester cabled yarns (1000 - 1 - 3 - Type 811) purchased from Hoechst Celanese Corp. Technical Fibers of Charlotte, N.C., making the total denier of the yarn going into the core about 48,000. Alternatively, the core can preferably contain 16 cabled yarns, each cabled yarn made by first giving a 1000 denier polyester yarn such as 1000 - 0192 - 1W74, available from Allied Signal Fibers, a 6.4 Z twist. Then three of these twisted yarns are twisted or cabled together with a 6.5 S twist to produce a cabled yarn with the total denier of the yarn going into each cabled yarn being about 3,000. These cabled yarns can be used instead of the Hoechst Celanese cabled yarns. For calf rope bodies, at least some of the monofilaments used in the core can have a higher density or a lower density than the fibers making up the major portion of the shell strands. The total denier of the yarn going into this preferred calf rope body is about 384,000. The total denier of the yarn going into other embodiments can vary as described in the summary of the invention above by using different amounts of yarn and/or different kinds of yarn and/or different deniers of yarn.

These specifications for the lariat rope body structures described above all apply to adult lariat rope body structures which are targeted to about 3/8 inch in diameter. The rope structure for children's lariats are smaller in diameter, e. g. 1/4 or 5/16 inches, and obviously the total denier of yarn going into the rope body is reduced accordingly when making rope bodies for children's lariats.

Referring again to FIG. 4, the rope 8 contains a core 14 in the center portion of the rope. The core is squeezed together by the strands 10 wrapped around the core 14 which comprises a plurality of yarns 16 which can be monofilament yarns, twisted or untwisted, plied yarns, and/or cabled yarns, other fabricated yarn configurations, and mixtures thereof.

A method of making the preferred rope body for a team head lariat will be described in detail as an illustration of the invention. The core 14 preferably consists of six cabled yarns, each cabled yarn made up of six 1260 (denier)- 0204 - 0.3 Z - 1R70 yarns cabled together by first plying two of the yarns together with a 3.6 Z twist (3.6 turns per inch or tpi), which latter twisting can vary by about +/−30 percent. Next, three of these plied yarns are twisted or cabled together with about a 2.7 S twist to make cabled yarn. In this preferred embodiment, the total denier of yarns going into each of six cabled yarns that are used to make the core is nominally 7560, making the total denier of the yarn going into the core about 45,360. Preferably, the core yarns are all nylon 6 such as that supplied by Allied Signal Fibers containing 192 monofilaments per yarn, but yarns made from other materials can be used to make up the core such as polyester, polypropylene, DACRON™ and many other materials. For various reasons, it is preferred to use nylon fibers from Allied Signal Fibers in the head rope bodies and nylon fibers from DuPont in the heel rope bodies.

The most preferred embodiment of the lariat rope and the lariat described above is made from yarn having a total denier of about 408,240, about 45,360 coming from the yarn in the core and the remainder from the yarn in four strands, each containing an equal amount of yarn.

The rope 8 is very hard, having been formed under hundreds of pounds of force against the strands as they were wound around the core, with the rope being under more than 100 pounds of tension, preferably more than 250 pounds and most preferably more than 500 pounds, during the rope making process. The rope 8 is impregnated and coated with a wax to make it smoother, slicker, and water resistant. The rope 8 may be of various colors by dyeing or by using colored fibers in the shell and/or core. The lariat rope or lariat of the present invention may also be coated or dusted with fine talc in a known manner to make the rope slide easier in a gloved hand.

Figure 7:
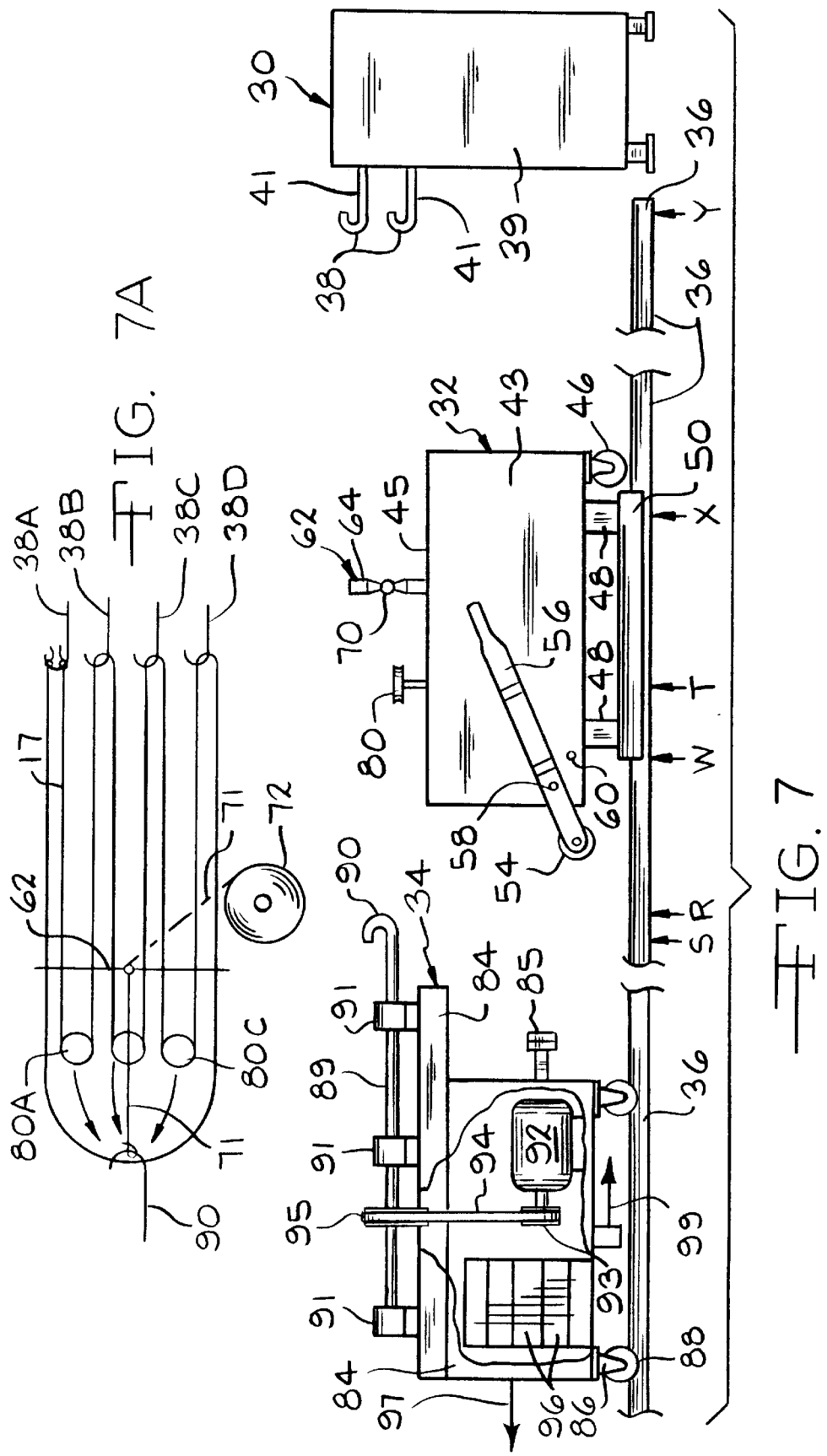
FIG. 7 is a front view of a walk along rope-making machine of the present invention with some of the components shown partially broken away to show interior elements.

FIG. 7 shows a preferred embodiment of a novel rope walk along machine, greatly shortened in scale, for making both the novel lariat ropes described above and conventional lariats and other ropes. This machine includes a head box 30, a cross box sled 32 and a tail box 34. The cross box sled (cross box) 32 and the tail box 34 can be moved back and forth from the head box 30 on one or two rails 36 in ways that will be described later. This walk along rope-making machine can be and usually is used with conventional accessories (not shown) such as one or more conventional creels for holding bobbins of yarn, an operator mover for allowing the operator to travel back and forth along the length of the machine faster than by walking and other conventional equipment typically used with conventional walk along rope-making machines. The walk along rope body-making machine illustrated herein and used to make the inventive rope bodies disclosed herein can be built all new or can be made by modifying a conventional lariat rope body walk along machine in the manner described later.

The individual subassemblies of the walk along machine will be described first, and then it will be explained how this machine is operated to produce a rope in accordance with the preferred embodiment.

Figure 8:
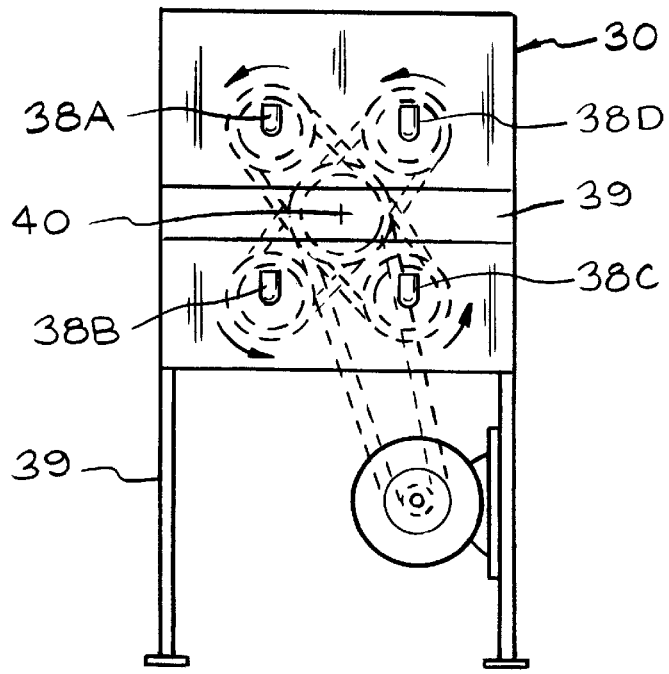
FIG. 8 is an end view of a head box apparatus made in accordance with the present invention, looking toward a head end of the rope-making line.

The head box 30 is also shown in end view in FIG. 8. The head box 30 is comprised of a plurality of bundle holding members, preferably hooks 38 (A, B, C, D), connected to rotatable shafts 41, a frame 39, a conventional motor drive and bearing mounts (not shown) for the hook shafts 41. The hooks 38 are generally equally spaced from a center point 40, forming a square in this embodiment, but they could be placed in a diamond shape also. Being equidistant or very near equidistant from a center point, a point within the confines or area of a line drawn between each of the hooks 38, is important to produce equal tension in each strand of the lariat rope. The prior art lariat rope machines placed the hooks on the head box generally along a straight line.

The head box 30 in these figures has four hooks 38, but can have more or less hooks for making different rope structures so long as each hook is about equidistant from a center point. For example, when making a three strand rope, the head box 30 would have three hooks in the form of a triangle and when making a five strand rope the hooks would lie on the circumference of a circle spaced apart about 72 radial degrees on the circumference. While hooks are preferred, any means for holding a bundle of yarns can be used such as an eye bolt or other shape that will allow the bundle to slide past the holder and still hold the bundle when the bundle is put under substantial tension.

Any conventional drive means for rotating the hooks, all in the same direction and at the same RPM, is suitable, such as a motor with a multi-groove pulley on the motor shaft and a drive belt running from each of the grooves to a pulley on each of the hook shafts 41 or the arrangement shown in FIG. 8. There a motor pulley drives a conventional jackshaft whose axis is in line with the center point of the hooks 38. The conventional jackshaft has a multi-grooved pulley mounted thereon which drives a pulley on each hook shaft 41 at the same rotational direction and speed via drive belts. If one wants to make left-handed lariat ropes, the drive direction should be reversible.

The head box is preferably fixed in position by fastening the frame 39 to the floor. The size of the frame 39, bearing mounts, hooks 38 and hook shafts 41 can be varied so long as they are strong enough to hold up to at least about 50 pounds of tension per hook 38 and preferably up to at least about 200–300 pounds of tension per hook 38. The hook shape is conventional and the hooks 38 are preferably made of a good wear resistant steel. When converting a conventional head box, which has three hooks spaced apart in-line, to the head box shown in FIG. 8, the old head box is modified to relocate the hooks 38 to be equidistant from the center 40 and to add or remove, if necessary, one or more hooks 38.

Figure 9:
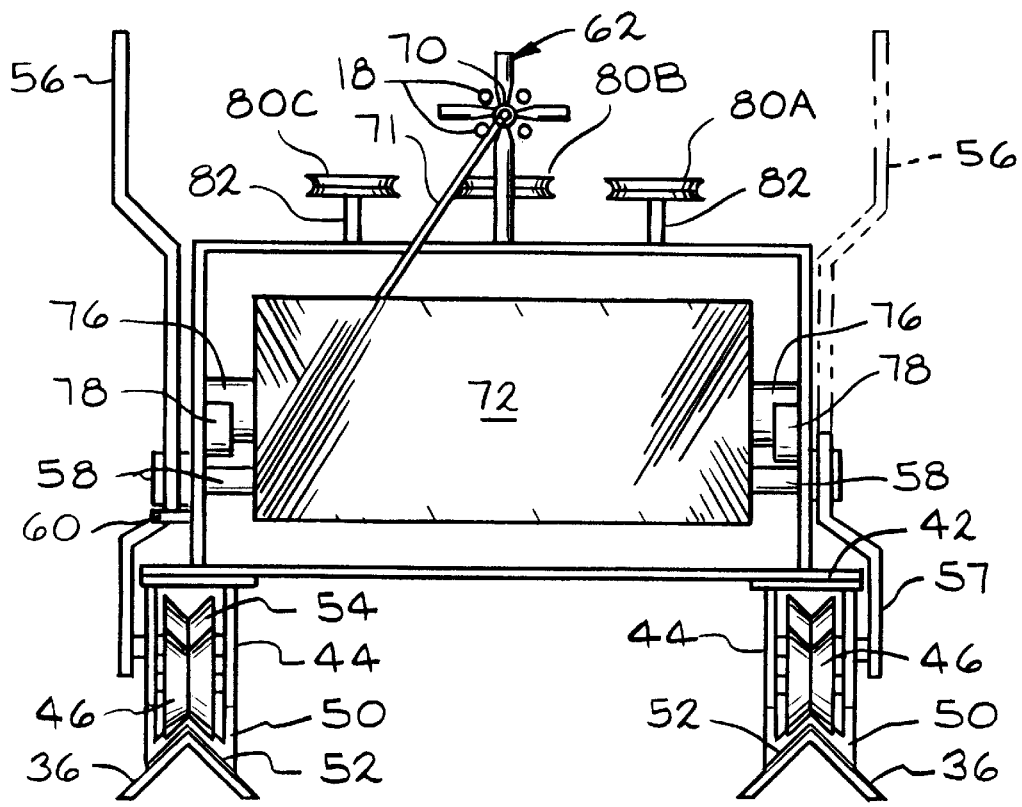
FIG. 9 is an end view of a cross box apparatus made in accordance with the present invention looking toward a tail end of the rope-making machine of the present invention.

FIGS. 7 and 9 show a preferred embodiment of a novel cross box or cross box sled 32, hereafter referred to as the cross box. The cross box includes a frame 42 including, sides 43, and a top 45. Front wheel brackets 44 are attached to the bottom side of the frame 42 near the end of cross box that is nearest the head box 30. Mounted on an axle inside each bracket 44 is a wheel 46 suspended slightly above rail 36. Each wheel has a V shaped grove around its periphery to run on angle rails 36. The cross box also has two wheels 54 at the tail box 34 end.

The wheels 54 are also grooved like wheels 46 and are normally suspended slightly above rails 36. The wheels are supported on an axle which in turn is supported by the lower end of a lever 56 on one side and either another lever 56 on the opposite side of the cross box, or a hanger 57 similar to the lower portion of lever 56. Each lever 56, and when only one lever 56 is used, the hanger 57, are both supported and pivot around an axle 58 passing through the sides 43 of the cross box a few inches up from the bottom and near the tail box end of the cross box 32.

The arrangement just described is designed such that, as will now be apparent to the skilled artisan, when the lever 56 is pulled towards vertical, the wheels 54 will contact the rails 36 and move the cross box upward also bringing the wheels 46 into engagement with the rails 36. When the lever 56 is pulled past vertical by about 5–10 degrees, the cross box lowers slightly, but not enough to disengage wheels 46 from rails 36. With this movement, a pin 60 extending outwardly from one side 43 of the cross box 32 contacts the lever 56, preventing the lever 56 from moving any further. The weight of the cross box 32 now holds the wheels 54 in this position engaged with the rails 36 until the lever 56 is moved back towards a vertical position and on to the position shown in FIG. 7.

The rail or rails 36 are preferably made of wear resistant steel angle oriented as shown, but can be of any shape known for such use of guiding a wheeled or runnered car in a straight path. Only one rail need be used, but two are preferred. When a rope is being made, the wheels are disengaged from the rails 36. Then, the cross box 32 is supported on the rails with an inverted V shaped runner 50 on each side of the cross box 32 being attached with brackets 48 that are attached to the underside of the frame 42 on both sides of the cross box above each rail 36. Each angle runner 50 is lined with a layer 52 of friction material. The preferred friction material is a layer of wood such as pine or oak having several layers, such as four layers, of cotton cloth on its working face. The layers of cloth are held onto the wood block by being attached to the sides with tacks or other conventional manner. This cloth is kept damp with a light oil or preferably diesel fuel.

In the preferred embodiment of the cross box 32, each runner 50 and layer 52 are about 28 inches long, but this length can be varied in accordance with the present invention to increase or decrease the force required to slide the cross box 32 along the rails 36 towards the head box 30. Also, weights (not shown) are placed inside the cross box 32 in the desired amount to cooperate with the runner 50 and the friction layer 52 to obtain the desired magnitude of force necessary to cause the cross box to slide along the rail(s) 36. Any kind of weight can be used such as metal plates, lead or steel shot, sand, a heavy liquid, etc. Obviously, other means of producing the desired magnitude of cross box drag, force needed to move the cross box 32 during the rope making process, could be used, such as a friction clutch, adjustable constant back tension force, etc. The magnitude of force needed to move the cross box 32 during the rope making process is critical to the characteristics of the rope and will be described in more detail later. Preferably, sufficient weights are placed inside the cross box 32 to require 200 pounds of force to pull or push the cross box 32 along the rails 36 when the cross box 32 is resting on its runners 50 and friction layer 52.

A novel cross 62 is mounted on the centerline of the top 45 of the cross box 32 near the end closest to the head box 30. A preferred embodiment of the cross 62 for making a three or four strand rope is shown in perspective in FIG. 12 and has four spokes 64 with the center line of each lying in the same plane and being at 90 degree angles with respect to one another. The outer portion of each spoke 64 preferably has a circular cross section, and the portion of each spoke 64 near where the spokes 64 connect to a rounded or spherical center piece 68 is tapered towards the center piece 68 forming tapered portions 66. The small end of each spoke 64 preferably adjoins a spherical member or portion 68 having a hole 70 therethrough from front to back. The cross member can have other shapes, for example the spokes 64 can be oval or some other shape in cross section, the tapered portion 66 can be oval in cross section, the spherical portion 68 can be like a thick washer with a flat surface on the head box and tail box sides. Conventional cross configurations can be used if modified to have the hole 70 in the center piece or intersection of the spokes.

The preferred cross has four spokes, but can have three spokes when making a three strand rope and should have more than four spokes when making a rope with more than four strands, e. g. five or six equally spaced apart spokes around a center piece 68 for a five or six strand rope. The hole 70 is preferably in the center of the cross 62 and, if not, is near the center. This is critical in the placement of the core in the center of the rope to form the core 14. Preferably, the cross is mounted such that the hole 70 aligns with the center point 40 on the head box 30 and a tail hook 90 on the tail box 34. The use of this novel cross to replace conventional crosses used on conventional cross boxes is essential to converting conventional rope body-making machines to make the novel rope bodies disclosed herein.

Figure 12:
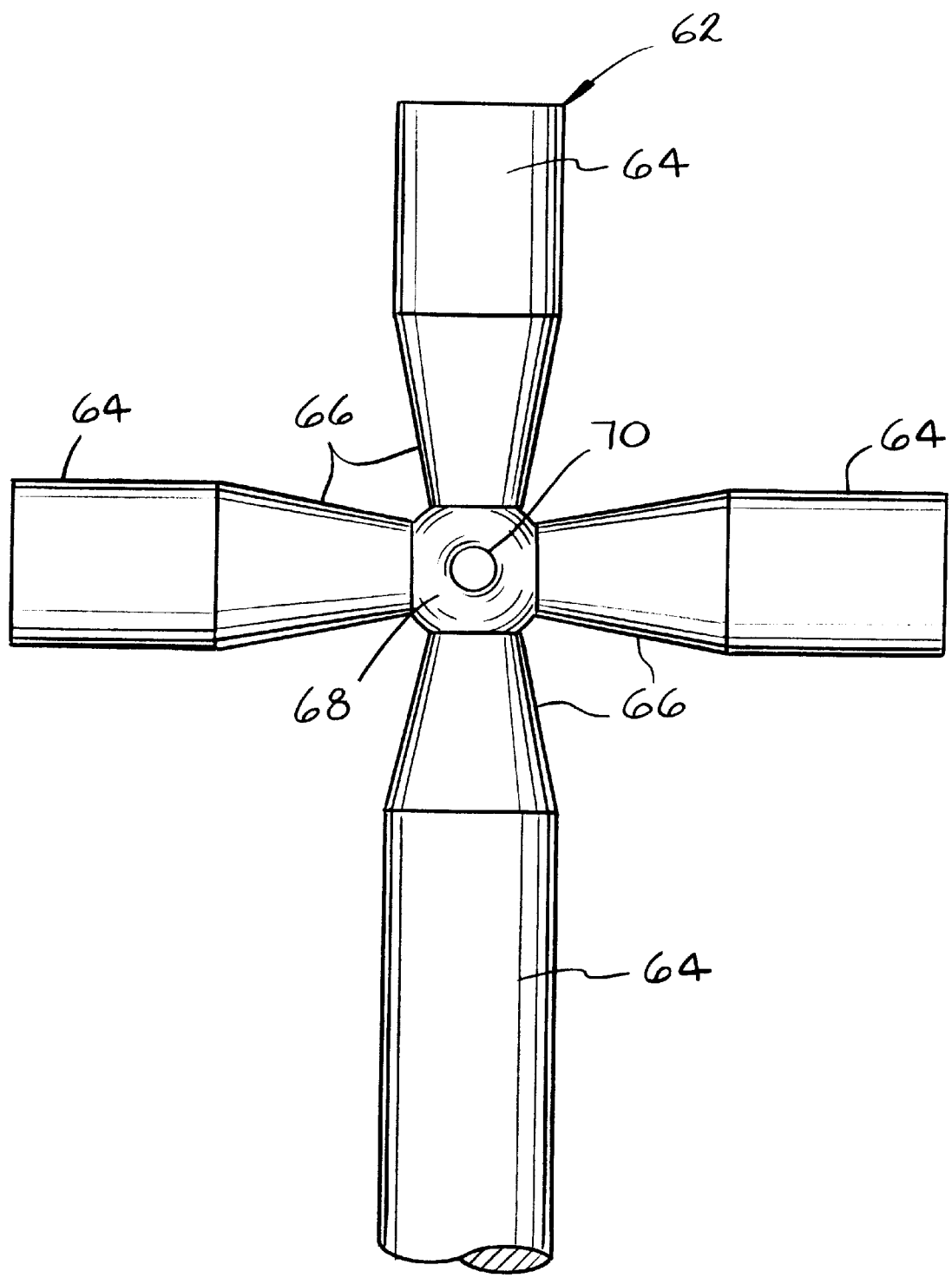
FIG. 12 is a perspective view of a preferred cross design in the present invention.

The design of the preferred novel cross 62 shown in FIG. 12 has the following dimensions. The ends of the cross members 64 are about 1.75 inches from the center of the hole 70 and the cross members 64 are round in cross section with a diameter of about 0.62 inch in the untapered portion. The tapered portion 66 is about 0.62 inch long. The diameter of the small part of the taper is about 0.37 inch. The spherical center portion 68 in the center of the cross is about 0.56 inch and the hole 70 is about 0.2 inch in diameter. The cross 62 is made from wear resistant high carbon steel. Other dimensions are also suitable as the skilled artisan can readily determine having the benefit of this disclosure.

Preferably, also mounted on the top 45 of the cross box 32 are three spaced apart grooved pulleys 80 that are free to rotate on shafts 82 attached to the top 45 in any known way such as with threads, welds, etc. Referring also to FIG. 7A, pulleys 80 A and C are mounted on the top 45 of the cross box near each side 43 and a few inches behind the cross 62, i. e. between the cross 62 and the end of the cross box 32 nearest the tail box 34. The third pulley 80 B is located right behind the cross 62 in the side to side center of the top 45, preferably in alignment with the other pulleys 80 A and C. When making a rope having more than four strands wound around a core, an additional pulley would be required for each strand and these can be mounted in line with the pulleys 80 A–C. These pulleys are used to form double bundles 18 (FIG. 5) of yarns of the proper length for making the strands for the rope as will be seen later. Instead of the grooved pulleys, vertical rods, each having a small smooth groove or each having a U shaped section in an upper portion with the bottom of the U pointed towards the head box 30, can be used instead.

The cross box 32 also carries a bobbin 72 of the core bundle 71 wound onto a heavy mandrel 76 (see FIG. 9). Each end of the bobbin mandrel 76 rests in a bracket 78 fastened inside each side 43 of the cross box near the head box end of the cross box 32 and high enough above the bottom so that a full bobbin 72 is free to turn to unwind. The core bundle 71 is threaded through the hole 70 in the center of the cross 62, preferably at the beginning of the rope making process.

When modifying a conventional cross box, it is preferred to mount pulleys 80 in the same manner as the cross box shown in FIG. 9. It is also preferable to modify a conventional cross box by modifying it to hold a bobbin or tube having core material wound thereon and to dispense the core strand in the manner shown in FIG. 9, or similar thereto. For example, the bobbin of core strand need not be horizontal and need not be centered horizontally on the axis of the hole 70 of the cross 62 and can be above or below the hole 70 so long as the core strand 71 can move unimpeded to and through the hole 70.

Figure 10:
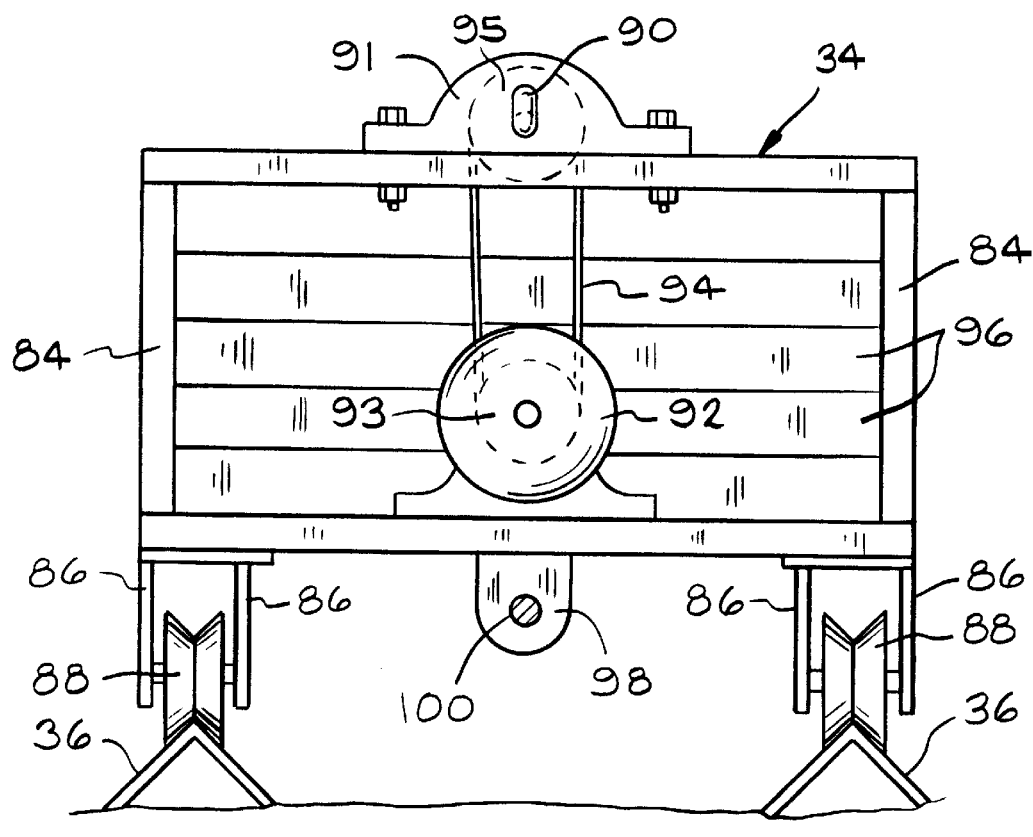
FIG. 10 is an end view of a tail box apparatus made in accordance with the present invention looking towards the tail end of the rope-making machine.

Referring to FIGS. 7 and 10, a novel tail box 34 includes a box frame 84 with its top preferably cantilevered towards the head box 30 enough to allow a tail hook 90 to rest over the grooved pulleys 80 when the tail box 34 and the cross box 32 are in the proper positions to start a twisting step in the rope making process. The frame 84 is supported on four wheels 88, grooved to ride on the rails 36, with one wheel 88 under each lower corner of the tail box 34 and supported with an axle fastened inside a bracket 86 attached to the tail box frame 84 in any suitable manner. A bumper 85 (see FIG. 7) is attached to the frame 84 in any suitable manner at the cross box 32 end of the tail box 34 and high enough (or short enough) that it clears the wheels 54 on the cross box 32 when the tail box 34 is moved close enough to the cross box 32 that the bumper 85 makes contact with the end of the cross box 32. The bumper 85 will actually push the cross box 32 towards the head box 30 during the rope making process as the tail box 34 is pulled towards the head box 30 by the shortening of the bundles 18 as they are twisted to form strands 10. Sufficient weights 96 are placed inside the tail box 34 to hold it firmly on the rails 36 during the rope making process.

A shaft 89 is supported in a rotatable manner with two or preferably three pillow block bearings 91 mounted on top of the frame 84 of the tail box 34 with the centerline of the shaft being above the longitudinal centerline of the tail box 34. Attached to or integral with the shaft 89 on the end nearest the head box 30 is a tail hook 90, preferably extending past the end of the frame 84 for easy access. A grooved pulley 95 is attached to the shaft 89 somewhere along its length, such as between two of the bearings 91. A motor or drive 92 having a drive pulley 93 and a drive belt 94 running in the grooved pulley 95 and drive pulley 93 rotates the shaft 89 and tail hook 90 in the rope making process. The RPM of the shaft 89 can be varied in any number of known ways, and the direction of rotation of the shaft can be reversed to make rope for a left handed roper in a known way.

The tail box 34 must be moved to position it properly to start the rope making process. This can be done in any one of several known ways, such as by pulling the tail box 34 from each end, depending upon which direction the tail box 34 needs to move. In the preferred embodiment, the tail box 34 has a drawbar 98 (FIG. 10) attached by any known manner to the bottom of the frame 84, preferably in the center of the bottom near the end closest to the head box 30. A cable 100, chain or other similar means can be pulled with a winch, etc. to move the tail box 34 in the direction shown by arrow 99 in FIG. 7.

The tail box 34 needs to have an adjustable, but constant, drag or back force 97 applied during later steps of the rope making process. This can be achieved in a number of ways as will be obvious to a skilled artisan. In the preferred embodiment shown here, this is achieved with a cable, chain or rope attached to the center of the rear of the frame 84 of the tail box with the other end of the cable, etc. being pulled with a constant force, such as a suspended counterweight hanging on the other end of the cable with the cable running over a free wheeling pulley (not shown). By changing the weight of the counterweight, the magnitude of the drag or back force 97 can be adjusted. By then adjusting the magnitude of the force on the cable 100 to a magnitude higher or lower than force 97, the tail box 34 can be pulled along the rails 36 towards or away from the head box 30.

The novel lariat rope bodies described above are made with the novel apparatus described above by a novel lariat rope body making process, of which a preferred embodiment is now described. In the manufacture of a 35 foot long inventive cored lariat rope, such as for a lariat used for team head roping, the lever 56 of the cross box 32 is pulled past vertical to raise the cross box 32 onto its wheels 54 and 46, and the cross box 32 is rolled by any suitable means towards the head box until the cross 62 is about four inches from the hooks 38 on the head box 30. At this time the hooks 38 are in a fixed position, preferably with the end of each hook 38 at or near the top as shown in FIG. 7.

Next, a bundle 17 of the preferred cabled yarn, or monofilament yarns, plied yarns and/or other cabled yarns, other fabricated yarn configurations or mixtures thereof is pulled from a plurality of bobbins or packages mounted on a conventional creel (not shown) located near the head box 30 and threaded up on the four hooks 38 A–D on the head box 30, the grooved pulleys 80 A–C on the cross box 32, and a tail hook 90 on the tail box 34, preferably as shown in FIG. 7A schematic. This can be done in other patterns or paths, but preferably is done by first tying the end of the bundle 17 to hook 38A, the upper left hook seen in FIG. 8. The bundle 17, preferably of six of the preferred cabled yarns, is then threaded around the pulley 80A on the same side of the cross box 32 and pulled back around the lower left hook 38B and on around the center pulley 80B and then around the lower right hand hook 38C and around the remaining pulley 80C and back around the upper right hand hook 38D. The bundle 17 is then pulled down to and around the tail hook 90 and pulled back to the upper left hook 38A, severed and the severed end tied to that hook (note the tail sticking out from each of the two knots on hook 38A).

This latter step is done as follows. The cross box 32 moved to a proper position to form four pairs of bundles 17, double bundles 18, of yarns of the proper length, which in this embodiment is ultimately about 61 feet long. The tail hook box 34 must also be moved to a proper location to position the tail hook 90 in the desired spot. Holding the bundle coming from the upper right hand hook 38D tightly in a hand, the operator moves with the cross box 32 to the point where the distance between the back of the pulleys 80A–C and the inside of the hooks 38A–D is about 60 feet. At this time the operator lowers the cross box 32 so the runners 50 are supporting the cross box 32 on the rails 36 by moving the lever 56 to the position shown in FIG. 7. In this position the cross will be directly above the location W shown on FIG. 7.

After the above steps, the tail box 34 is at a point where the tail hook 90 is just above the pulleys 80 and just above the position R shown on FIG. 7. The operator then transfers the bundle going around each pulley 80A–C to the tail hook 90, as shown by the arrows in FIG. 7A, and also loops the bundle being held in his hand around the tail hook 90. The operator, still holding the bundle 17 of yarns in his hand, but now loosely so the bundle 17 can slip through his hand, moves back to the head box 30, pulls the slack out of the bundle of yarns between his hand and the tail hook 90, severs the bundle 17 and ties the severed end of the bundle still in his hand to the upper left hook 38A on the head box 30. The operator now has four double bundles 18 of yarn, i. e. each double bundle 18 containing twelve cabled yarns in this preferred embodiment, each double bundle being about 60 feet long, the length depending upon the length of finished rope body desired and the desired hardness, density, of the finished rope body, and stretched between the tail hook 90 and one of the four head box hooks 38, as shown in FIG. 7A.

In the preferred embodiment described here the yarns from six bobbins are all alike, each being cabled nylon referred to as 1260-2 (3.4 Z) - 3 (3.07 S). However, many combinations of monofilament yarns, plied yarns and/or cabled yarns of nylon, polyester, polyethylene, Dacron™, cotton and other fibers of other materials and mixtures thereof can be used in accordance with the present invention. In this preferred embodiment of the inventive method, the denier of each cabled yarn is about 7560, but that can also be varied substantially for different lasso ropes as described earlier. The plied yarns can contain two or more monofilament yarns, and the cabled yarns can contain different numbers of plied and/or twisted yarns or a combination of one or more plied yarns and one or more monofilament yarns twisted together.

The starting 1260 monofilament yarn used to make the cabled yarns used in this embodiment to make the lariat rope shown in FIGS. 3 and 4 is preferably a nylon monofilament yarn having 204 filaments with about 0.3 Z twist, such as nylon 1260-204-0.3Z - 1R70 from Allied Signal Fibers, but can be other yarns from other suppliers, being of the same or different material, having different numbers of filaments therein, different deniers, different amounts and/or direction of twist, and different finishes or treatments (the 1R70 designation refers to the finish or treatment of the yarn by the supplier). For example, the denier can vary at least within the range of about 500–1680 and the filament count can vary considerably. The diameters of the monofilaments can also vary. While the lariat rope body being made here has four strands around a core, the number of strands can be as few as three and more than four such as up to 6 or 8 strands.

Next, the operator moves the tail box 34 about one foot further away from the cross box 32 bringing the tail hook 90 to a spot directly above arrow S in FIG. 7. This is accomplished in this instance by increasing the tension force 97 on the tail box 34 to about 600 pounds higher than the tension force 99. This puts a tension of about 600 pounds divided by the total number of yarns, in this case 48 cabled yarns (4 double bundles of 12 cabled yarns each), 12.5 pounds per cabled yarn in this preferred example. This tension force can be varied, such as up or down by at least 10 percent to make different kinds of lariat rope structures.

Next, unless done earlier, the operator places a bobbin 72 of wound core bundle 71 on a heavy mandrel 76 into the brackets 78 as shown in FIG. 9 and threads the core bundle 71 through the hole 70 in the center of the cross 62 and ties the end of the core bundle 71 to the tail hook 90. The core bundle 71 preferably consists of six cabled yarns, each cabled yarn preferably made from the same starting yarn used in the strands for the shell and made in the same manner as the cabled yarn used in the bundle 17, except that some spliced cabled yarn can be used. The cabling twist can vary by up to about +/−30 percent and the number of cabled yarns used in the core can be at least as few as five and at least as many as seven.

In this embodiment, each of the six cabled yarns is 7560 denier making the core 45,360 denier. Preferably, the core yarns are all nylon for head and heel team roping lariats, but they can be all or partly yarn of a different nylon or different material, such as polyester as supplied by Allied Signal Fibers containing 192 monofilaments per yarn. The latter yarn is especially good for the core of calf roping lariats. Also, other configurations of yarns can be used to make up the core. For certain purposes, such as calf roping lariats, at least some of the monofilaments used in the core preferably have a higher density, weight per unit volume, than the monofilaments making up the major portion of the shell strands 10.

The operator then makes sure that each of the double bundles 18 is in a separate and appropriate quadrant of the cross 62, as shown in FIG. 9. The double bundles 18 attached to the upper hooks 38 should be in the upper quadrants of the cross, etc. so each double bundle 18 is running straight between its head box hook 38 and the tail hook 90. The operator makes sure that each bundle of each double bundle 18 is coming from the same hook 38. Each double bundle 18 preferably contains twelve of the cabled yarns and will form one strand 10 having a denier of about 90,720.

Figure 5:
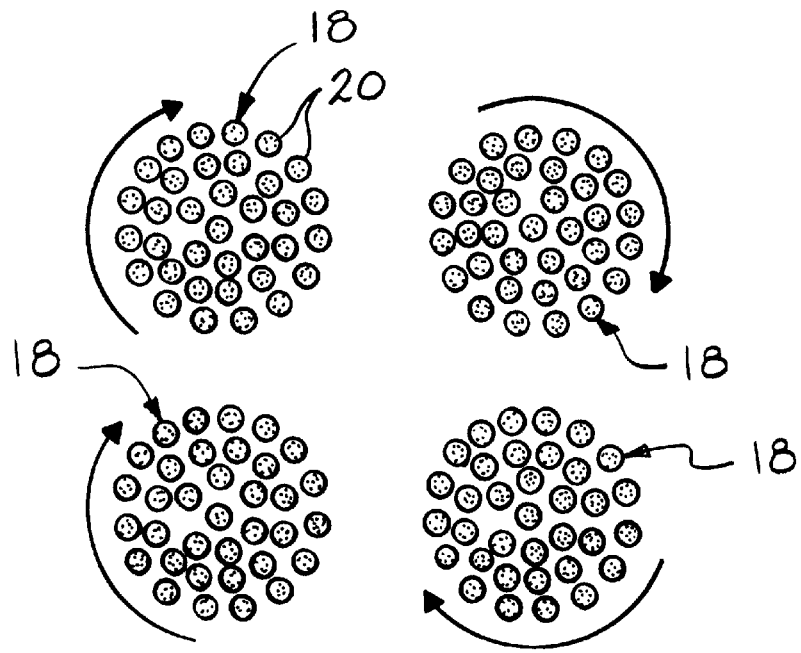
FIG. 5 is a cross section of an intermediate structure of four double bundles of loose, individual yarns, looking from a head box end towards a tail box end and showing the direction the double bundles are twisted in a preferred embodiment of the process of the invention.

Now the operator starts the motor in the head box 30 and begins twisting the four double bundles 18, while under the tension of about 600 pounds as described in the preceding paragraph. The cabled yarns 20 in all of the double bundles 18 are now all twisted in the same direction, clockwise as shown in FIG. 5, which is a cross section taken between the head hooks 38 and the cross 62 at the beginning of the double bundle twisting operation to make strands 10, looking in the direction of the tail box 30 at the cross section. While the rate of twist can vary as a matter of choice, the RPM of the head hooks 38 in this preferred embodiment is about 850.

As the twisting of the double bundles 18 to make the strands 10 progresses, the length of the double bundles 18 becomes shorter pulling the tail box 34 forward against the constant tension of about 600 pounds in the preferred embodiment and quickly causing the bumper 85 on the tail box 34 to contact the end of the cross box 32. Once this happens, the tail box 34 must push the cross box 32 along the rails 36, and this happens as the twisting of the double bundles 18 continues shortening each double bundle 18 to make strand 10. This contact adds the force required to slide the cross box runners 50 and friction layer 52 along the rails 36 which, in this preferred embodiment, is about 200 pounds, but this magnitude can be greater or lesser than this. Thus, the double bundles 18 in this preferred embodiment are very soon being twisted under a tension of about 800 pounds total, or about 16.7 pounds per yarn.

As the tail hook 90 is pulled towards a spot above the rail shown as T in FIG. 7, the twist in the strands 10 becomes so great that the strands between the fixed tail hook 90 and the cross 62 begin winding around the core 14 forming the lariat rope. Initially the cross 62, and the resistance to movement of the cross box 32, prevents the rope winding from moving the cross box 32 further away from the tail hook 90.

Figure 6:
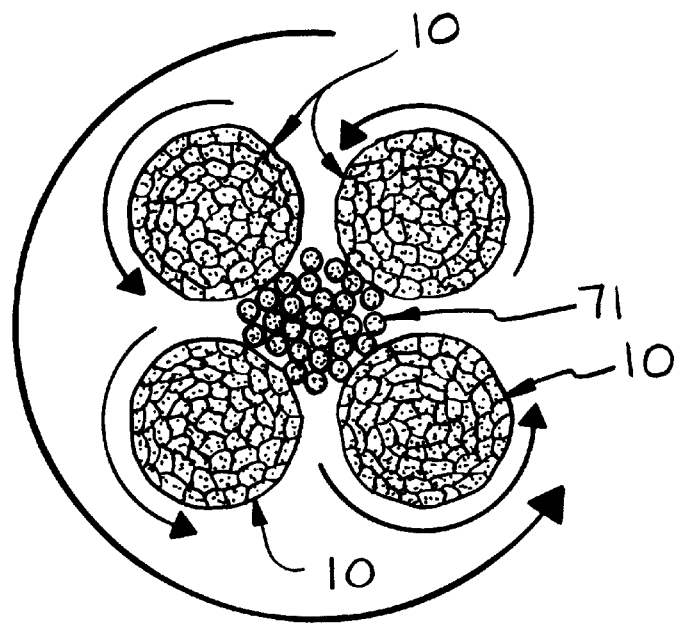
FIG. 6 is a cross section of an intermediate structure of four partially twisted strands around a core, looking from the tail box end towards the head box end, showing the direction the partially twisted strands are being twisted and the direction the twisted strands are wound or wrapped around the core in the preferred process of the present invention.

In this method embodiment, when the tail hook 90 reaches a distance of about 47 feet from the head box hooks 38, a point directly above the spot marked with the arrow T in FIG. 7, the cross 62 will be above the arrow marked X in FIG. 7. At this time the operator turns on the drive motor 92 for the tail hook 90. This causes the tail hook 90 to rotate the strands 10 in a counter-clockwise direction looking towards the head box 30, as shown in FIG. 6, which winds the strands 10 around the core 14. In this preferred embodiment the tail hook 90 rotates at about 1100 RPM, but other rotation rates would be acceptable, particularly if the rotational speeds of the hooks 38 are also changed accordingly. While the tail hook 90 is rotating, the head box hooks 38 continue to twist the double bundles 18, or strands 10, and the back force of 600 pounds remains on the tail box 34.

The winding of the strands 10 around the core 14 by the rotating tail hook 90, building the rope 8, pushes against the cross 62 with a force exceeding 200 pounds causing the cross box 32 to move along the rails 36 towards the head box 30. As the cross 62 moves towards the head box 30, the core bundle 71 is pulled from the bobbin 72 and moves through the hole 70 and into the center of the rope 8 as the strands 10 are wound around the core bundle 71 squeezing it together into a dense core 14 as shown in FIG. 4. The combination of the magnitude of resistance to the cross box 32 moving on the rails 36 and the magnitude of the back tension on the tail hook 90 cooperate in providing tightness and stiffness characteristics to the rope 8.

This process continues until the cross is within about one foot from the head box hooks 38 and directly above the arrow Y in FIG. 7. At that time the head box motor and the tail box motor 92 are shut down. Tape is wrapped tightly around the rope close to the tail box side of the cross 62, the back force 97 on the tail box is reduced to zero and the rope 8 is cut between the tape and the cross. The now loose strand material hanging from the hooks 38 is removed and discarded. The other end of the rope 8 is slid off of the tail hook 90 and the section of rope 8, called a body, is ready for further processing into a lariat.

The rope body is placed in a vat of hot wax, preferably at about 300 degrees F., that is longer than the body so the body can lay generally straight. The temperature can vary somewhat so long as the temperature is high enough to relax the stress in the body that would tend to make the rope curl or bend and high enough to make the viscosity of the molten wax low enough to penetrate the strands and yarns of the rope. While any conventional wax used for this purpose by the trade is suitable for this invention, the wax used in the preferred embodiment described here was a microcrystalline wax called Microsere™ 5897 available from The International Group, Inc. of Wayne, Pa. This wax has a melting point of 188 degrees F., a penetration of 18 at 77 deg. F. and a penetration of 43 at 100 deg. F. and a viscosity of 100 SUS at 210 deg. F.

Figure 11:
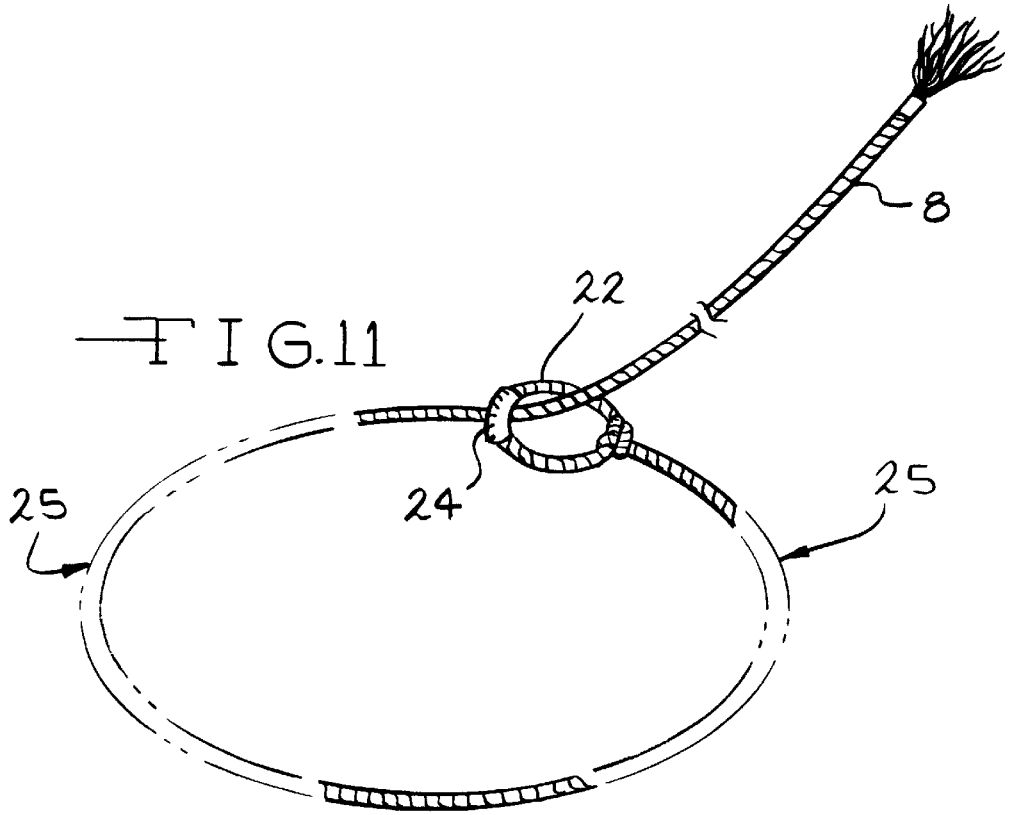
FIG. 11 is a rope lasso of the present invention showing a honda and a burner.

After laying in the hot wax for about 10 minutes, the rope body is removed from the vat and placed on a conventional stretcher to hold the rope straight while the rope and wax cool to close to room temperature. The cooled rope is now ready to form a honda 22 in one end in a known manner and to sew a wet rawhide burner 24 onto the inside of the honda in a conventional manner as shown in FIG. 11. The other end of the lariat rope is put through the honda to form a loop 25. The lariat rope 8 and loop 25 are formed into a coil and dusted with powdered talc in a known manner to complete the manufacture of a lariat.

In another embodiment of a lariat rope body, the yarns 12 in the strands 10 are all alike and are twelve in number being cabled nylon referred to as 1260 - 2(3.4 Z) - 3 (3.07 S). The designation 1260 - 2(3.4 Z) - 3 (3.07 S) means a cabled yarn made by twisting three plied yarns together by twisting in the S direction in an amount of about 3.07 turns or twists per inch (tpi) of cabled yarn in a known manner, each plied yarn having been made by twisting two 1260 denier monofilament yarns together in the Z direction in an amount of about 3.4 tpi of plied yarn, in a known manner. The twists of the plied yarn and the cabled yarn can vary, such as from about 2 tpi to about 6 tpi, preferably by about 30 percent above and below the preferred amounts shown above. In the summer, when it is hot in the plant, the twist is reduced, for example to about 2.5 tpi. In this rope structure, the denier of each cabled yarn is about 7560. The plied yarns can contain more than two twisted or untwisted monofilament yarns, and the cabled yarn can contain different numbers of plied yarns or a combination of plied yarn and monofilament yarn twisted or cabled together.

The starting 1260 monofilament yarn was a nylon monofilament yarn having 204 filaments with about 0.3 tpi Z twist, such as nylon 1260-204-0.3Z - 1R70 from Allied Signal Fibers, but can be other yarns from other suppliers, being of different material, having different numbers of filaments therein, different deniers, different amounts and/or direction of twist, and different finishes or treatments (the 1R70 designation refers to the finish or treatment of the yarn by the supplier). For example, the denier can vary at least within the range of about 500–1680 and the filament count can vary considerably, which sometimes will necessitate a change in the diameter of the individual filaments.

The core 14 consists of 15 cabled yarns, each cabled yarn made up of one 1000 - 192 - 6.4Z - 1W74 and two yarns of 1000 - 0.00Z 1W74 cabled together by twisting at 6.5 tpi, which latter twisting can vary by about +/−30 percent. In this embodiment, each of the 15 cabled yarns is 3000 denier making the core about 45,000 denier. Preferably, the core yarns are all polyester such as that supplied by Allied Signal Fibers containing 192 monofilaments per yarn, but other yarns can be used to make up the core. At least some of the monofilaments used in the core have a higher density, weight per unit volume, than the fibers making up the major portion of the shell strands. This embodiment of the lariat rope body has a total denier of yarn in the rope of about 407,880, about 45,000 coming from the yarn in the core and the remainder from the yarn in the four strands at about 90,720 each. This rope body is made on the novel apparatus described above in the same method as described above for the preferred embodiments and can be finished into a lariat in the manner described above. This rope body is used to make lariats that are superior to prior art three-strand lariats.

To satisfy customer preferences, rope bodies and lariats of differing degrees of hardness are produced. By hardness is meant the tightness or density of the rope structure. The tighter the twist and winding, the harder is the rope and the higher is its density. Differing grades of hardness range from double extra soft, extra soft, soft, medium soft, medium, hard medium, medium hard, and hard. In making the preferred head ropes described above the hardness is measured by the diameter of the rope and a crown count per yard along the rope. The diameter of the rope is held close to the nominal size, such as ⅜ inch or 5/16 inch, but the crown count is varied to give the differing degrees of hardness. The crown count is measured by laying the rope body out straight and laying a yardstick along the rope. The number of crowns (the top dead center of each strand) along a line defined by one edge of the yardstick is counted over a yard. The more crowns per yard, the harder the rope and the tighter and stiffer the rope.

The most preferred embodiments described in the summary of the invention above have the following crown counts and diameters variations between different grades or hardnesses of the lariats and rope bodies:

Heel rope bodies/lariats—Crown count varies from about 140/yard (soft) to about 143/yard (hard) while the average diameter ranged from about 0.385 to about 0.39 for 10 ropes (nominal ⅜ inch products) with an average of 0.387.

Head rope bodies/lariats—Crown count varies from about 137/yard (extra soft) to about 140/yard (medium) while the average diameter ranged from about 0.395 to about 0.40 for 10 ropes (nominal ⅜ inch products) with an average of about 0.397.

Calf rope bodies/lariats—Crown count is about 142/yard for a rope diameter of about 10.25 millimeters. The diameter of the ropes vary with the intended use or event, such as tie down event, breakaway event, and steer roping with the diameter varying between about 9.5 millimeters and 11 millimeters with the steer roping rope diameter being the largest and the breakaway rope diameter being the smallest.

The lariat rope bodies and lariats made according to this invention are superior to conventional lariats and rope bodies in many ways. Ropers of all levels of skills have concluded after testing the ropes in actual application, including rodeo roping competition, that the inventive lariats perform better and last longer than conventional lariats. The ropers like the way the lariat feels and works and particularly like the longer life of these inventive lariats. They like the way the slack pulls from the loop, and especially so in the calf ropes. They also like the stability or consistency of all the lariats in various temperature and humidity conditions.

Having the benefit of the above description of the invention and the most preferred embodiments, many suitable variations will now be apparent to those skilled in the art, which obvious modifications are intended to be included in the scope of the following claims.

I claim:

1. A cattle roping lariat rope body comprising:
   a) a core in a center portion of a cross section of the rope body, said core comprising monofilament yarns with the total denier of monofilaments in the core being at least about 30,000, the core extending the full length of the cattle roping lariat rope body,
   b) three or more twisted strands wound around the core to form a rope structure, said strands containing twisted monofilament yarns throughout a cross section of each strand, and
   c) a wax among at least some of the monofilaments in at least some of the yarns.

2. The lariat rope body of claim 1 wherein the majority of the monofilaments in the core are nylon material.

3. The lariat rope of claim 2 wherein the rope structure contains at least four strands.

4. The lariat rope body of claim 1 wherein the strands contain nylon monofilaments in the form of one or more of monofilament yarns, plied yarns and cabled yarns.

5. The lariat rope of claim 1 wherein the majority of the monofilaments in the strands are nylon material.

6. The lariat rope of claim 1 wherein the rope structure contains at least four strands.

7. The rope body of claim 1 wherein there are one or more splices in one or more of the monofilament yarns in the core.

8. A cattle roping lariat rope body comprising:
   a) a core in a center portion of a cross section of the cattle roping lariat rope body and extending the full length of the rope body comprised of monofilament yarns containing monofilaments of a material selected from a group consisting of nylon, polyester, polypropylene, and polyethylene, the monofilaments in the core having a total denier of about 40,000 to about 58,500,
   b) four or more strands wound around said core to form a rope, each of said strands comprised of twisted yarns of monofilaments of a material selected from a group consisting of nylon, polyester, polypropylene and polyethylene, each strand containing twisted monofilament yarns throughout its cross section, the total denier of the monofilaments in each of said strands being in the range of about 75,000 to about 95,000, and
   c) a wax between at least some of the monofilaments in at least some of the yarns.

9. The rope body of claim 8 wherein the rope body comprises four strands, the total denier of each strand is in the range of about 84,000 to about 95,000, and the total denier of the monofilament yarns in the rope body are in the range of about 407,000 to about 416,500.

10. The rope body of claim 9 wherein the majority of the monofilaments in the core and each of the strands are nylon, the total denier of the monofilaments in the rope body are about 407,000 to about 409,000.

11. The rope body of claim 10 wherein the nylon is nylon 6, the total denier of the monofilaments in the core is about 44,500 to about 45,500 and the core contains six yarns.

12. The rope body of claim 9 wherein the majority of the monofilaments in the core and each of the strands are nylon, the total denier of the monofilaments in the rope body are within the range of about 302,000 to about 424,000.

13. The rope body of claim 12 wherein the nylon is nylon 66, each strand contains twelve yarns and the total denier of the monofilaments in each strand is about 90,000 to about 91,000.

14. The rope body of claim 9 wherein each strand contains yarn of and the total denier of monofilaments in the rope body is about 383,000 to about 385,000.

15. The rope body of claim 8 wherein there are one or more splices in one or more of the monofilament yarns in the core.

16. The rope body of claim 8 wherein the majority of the monofilaments in the strands are polyester.

* * * * *